March 11, 1958  H. L. FORMAN ET AL  2,826,309
EDGE TYPE FILTER ELEMENTS AND METHODS OF MAKING THE SAME
Filed June 26, 1953  4 Sheets-Sheet 1
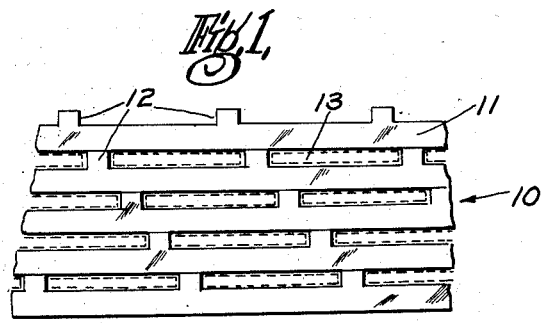
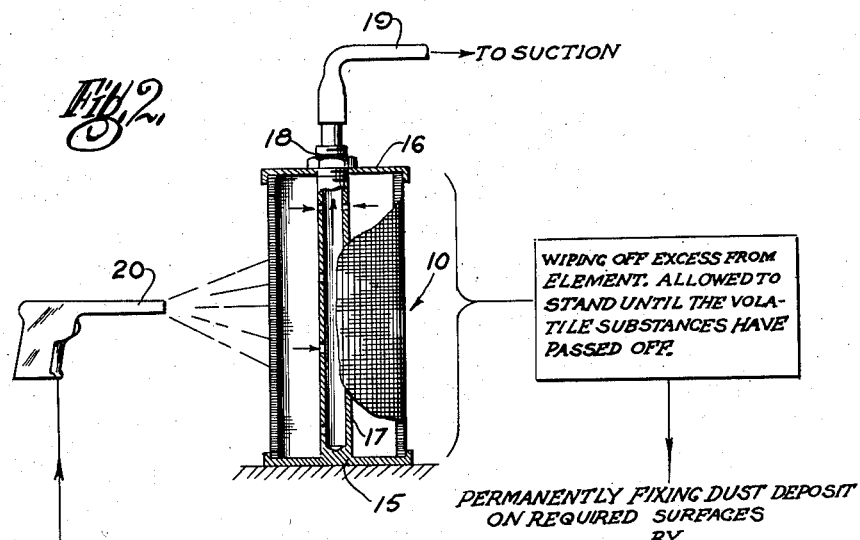
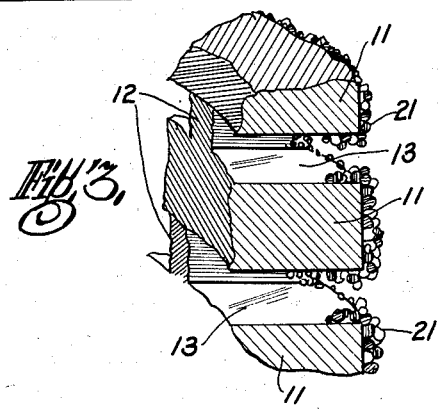
INVENTORS
HERBERT L. FORMAN
RONALD A. BURLA
BY
ATTORNEYS

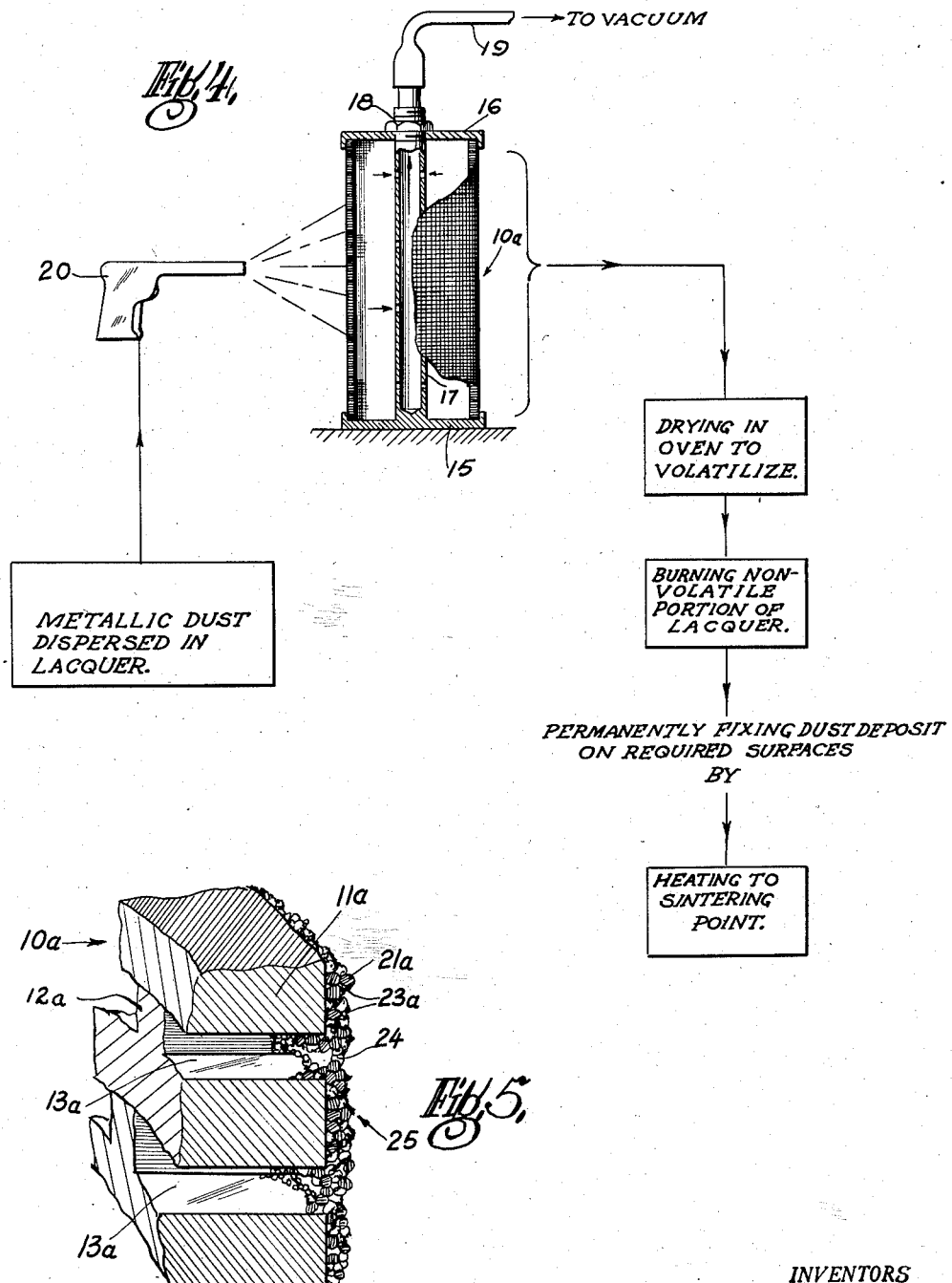

March 11, 1958     H. L. FORMAN ET AL     2,826,309
EDGE TYPE FILTER ELEMENTS AND METHODS OF MAKING THE SAME
Filed June 26, 1953     4 Sheets-Sheet 3
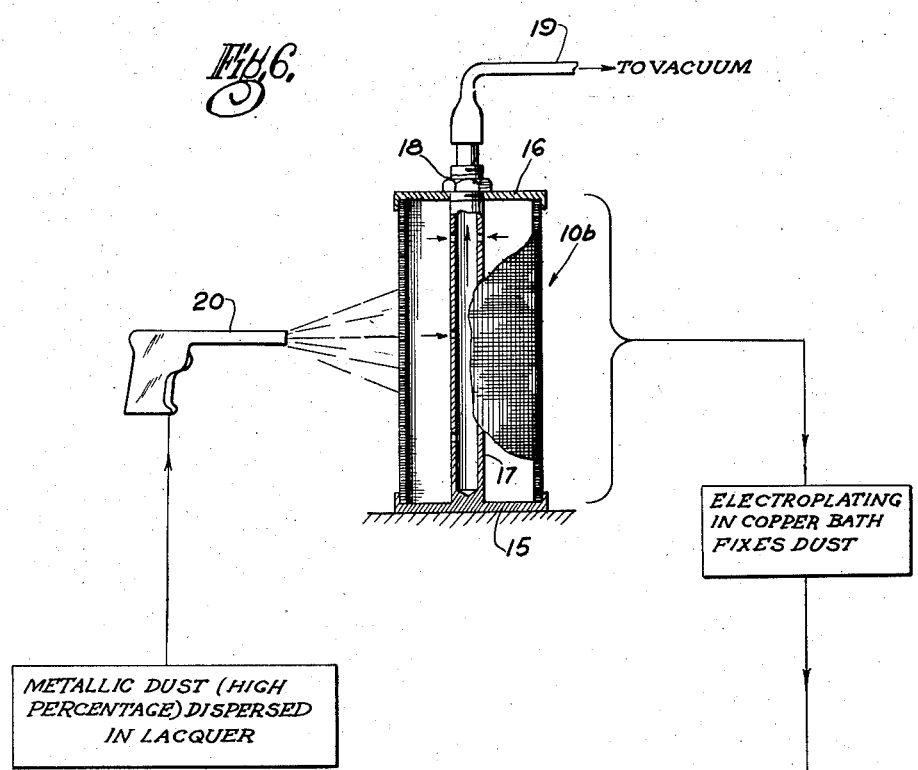
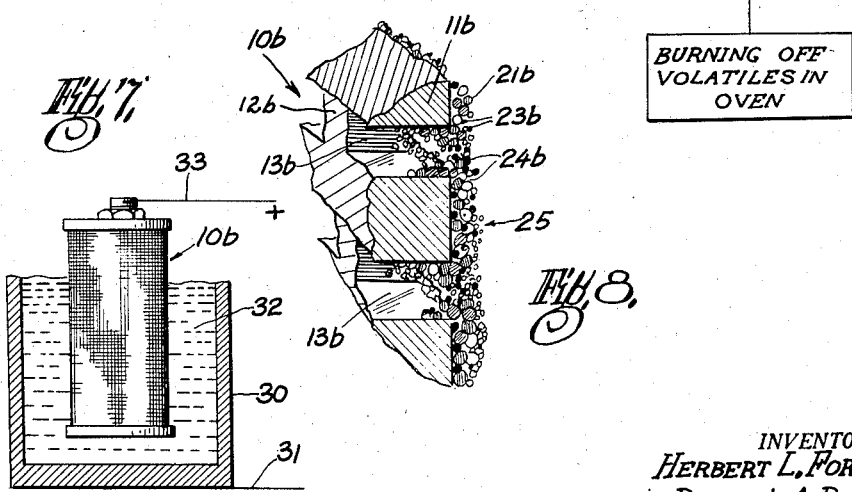
INVENTORS
HERBERT L. FORMAN
BY    RONALD A BURLA
Kenyon & Kenyon
ATTORNEYS

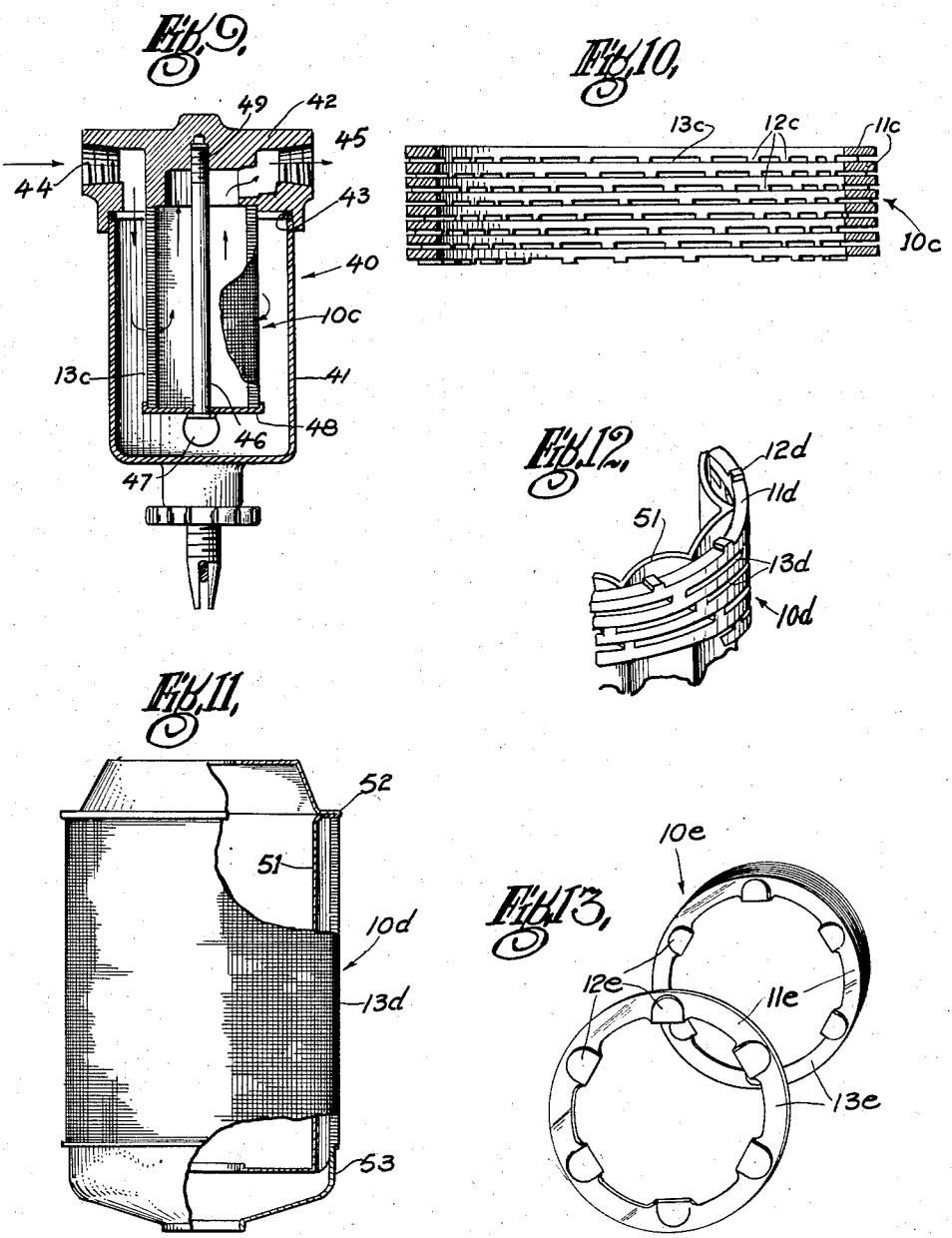

United States Patent Office 2,826,309
Patented Mar. 11, 1958

2,826,309

EDGE TYPE FILTER ELEMENTS AND METHODS OF MAKING THE SAME

Herbert L. Forman, Plainfield, and Ronald A. Burla, Cranford, N. J., assignors to Purolator Products, Inc., Rahway, N. J., a corporation of Delaware Application June 26, 1953, Serial No. 364,338

6 Claims. (Cl. 210—488)

This invention relates to improvements in metal edge type filters and in methods of making the same.

Edge type filter elements are known and have been in use in several different embodiments. Examples of such embodiments are the helically wound frame type such as is disclosed in Liddell Patent 2,042,537, granted June 2, 1936; the helically wound frameless type as disclosed in Kovacs Patent No. 2,622,738, granted December 23, 1952, and the so-called stack type such as are shown, for example, in Heftler Patent 2,436,108 granted February 17, 1948, and in the Fulcher et al. Patent 1,673,743, granted June 12, 1928.

The helical type of filter comprises generally a slotted metal cylinder which is composed of a wound helix of metallic ribbon of minute thickness. This ribbon has wide faces that are normal to the axis of the helix and filtering slots are provided between the turns of the ribbon. The slots are usually provided by ribs or projections extending from one of the wide faces of the ribbon and into contact with an adjacent smooth wide face of the adjacent turn of the ribbon. The adjacent turns of the ribbon are thus spaced apart desired distances depending upon the heights of the ribs or projections. In consequence, the metal cylinder formed by a plurality of turns of helically wound ribbon has narrow filtering slots or interstices each of a definite or determined area as defined by the ribs or projections and the wide faces of the ribbon. Since the ribbon itself is thin the proportion of the slotted filtering area is high relative to the total area in the surface of the cylinder formed by the helically wound ribbon.

In the helically wound frame type of filter element, as exemplified in the aforesaid Liddell patent, the ribbed ribbon is wound on a fluted drum which acts to reinforce the cylinder formed by the helically wound turns of the ribbon and also facilitates maintenance of the turns in alignment. In the helically wound frameless type of filter element, as exemplified in the aforesaid Kovacs patent, the slotted cylinder forming the filter element is made by coating the rib-provided ribbon with fusible material and then winding this ribbon on a temporary rather than on a permanent drum to form a slotted cylinder. The ribbons on adjacent turns abut the smooth faces. The cylinder is heated to melt the fusible material or coating sufficiently to join the ribs to the smooth wide face of an adjacent turn. The drum thereafter is removed. Because of the fusion a completely self-supporting slotted filter cylinder results. Here again the slots or filtering interstices have determined or definite areas which are defined by the ribs and wide surfaces between adjacent turns. The total of the areas of these interstices constitute a relatively large proportion of the area of the outer surface of the filter element.

In the stack stype of edge type filter element a series of rings or washers provided with raised surfaces are piled upon one another to form a cylinder. The raised portions between adjacent washers provide slots or interstices for filtering purposes. These filtering interstices again have determined or definite areas.

In practice it is found that within the limits of mechanical manufacturing procedure the filtering slots or interstices and consequently their areas cannot be made small enough to meet all desired filtering conditions by the provision simply of projections, spacers or ribs upon ribbons or upon washers forming the filter elements.

Principal objects and features of this invention are to provide a method of treatment of edge type filter elements of the types just described after they have been manufactured in accordance with the practices of the aforesaid patents so as to change or vary the sizes of the areas of the filtering slots or interstices available in the manufactured elements to any desired smaller amount to meet desired filtering conditions.

Further objects and features of this invention are the provision of methods of treatment of said edge type filter elements whereby an effective control of the sizes of the areas of the filtering slots or interstices may be effected.

Further objects and features of the invention are the provision of simple methods of treatment of commonly known edge type filter elements such as those hereinbefore mentioned which will eliminate any necessity for revision or modification of the machinery presently used in the manufacture of such edge type filter elements. The invention further contemplates the application of the methods hereinafter described to any edge type metallic filter element presently extant that has filtering areas or interstices of determined dimensions.

In general, the method practiced in carrying out this invention comprises coating of the external surfaces of edge type filter elements with a metallic dust dispersed in a volatile liquid dispersant, thereafter eliminating the volatile component of the dispersion and subsequently applying heat and possibly other treatment to the deposited dust of the dispersion to fix the latter on wall portions of the interstices or slots and on external surfaces of the adjacent solid portions of the slotted cylinders of these elements. By regulation of the quantity of dust deposited, changing the nature of the dispersant and number of coatings of dispersion applied the sizes of the areas of the slots can be restricted to any desired dimensions to meet specific filtering conditions without changes in the manufacturing procedure utilized in the first instance to form the filter elements.

Further objects and features of the invention will become apparent from the following specification and the accompanying drawings, wherein:

Figure 1 is an enlarged fragmentary elevational view of an edge filter element embodying the invention, it being understood that this view is intended as a diagrammatic showing of either the helically wound frame type, or the frameless type elements or the stack type element;

Figure 2 is a flow diagram illustrating a preferred method of treatment of filter elements of the type described for the purposes herein intended;

Figure 3 is an enlarged fragmentary vertical section through a filter element that has been treated in accordance with the method of Figure 2;

Figure 4 is a flow diagram illustrating an alternative method of treatment of filter elements of the type described;

Figure 5 is an enlarged fragmentary vertical section through a filter element that has been treated in accordance with the method of Figure 4;

Figure 6 is a flow diagram illustrating a further alternative method of treatment of filter elements of the type described;

Figure 7 is a diagrammatic illustration of a step detail of the method of Figure 6;

Figure 8 is an enlarged fragmentary vertical section of a filter element that has been treated in accordance with the method of Figure 6;

Figure 9 is a partial vertical section through a filter housing showing a helical frameless edge type filter element that has been treated in accordance with the methods of this invention mounted in position of use in said housing;

Figure 10 is an enlarged fragmentary vertical section of the filter element of Figure 9;

Figure 11 is a partially broken away elevational view of a helical edge type filter element of the frame type that has been treated in accordance with the practices of the methods of this invention;

Figure 12 is a fragmentary perspective view on an enlarged scale of a part of the filter element of Figure 11; and Figure 13 is a perspective view of a part of a stack type filter element that may be treated in accordance with the practice of the method of this invention.

Referring now to the drawings and first to Figure 1, 10 denotes an edge type filter element in the form of a slotted cylinder of any of the three types of elements hereinbefore mentioned. The reference character 11 denotes either a turn of thin flat metallic ribbon used in forming the helical edge type filter element or one of the washer-like components of a stack type filter element. The reference character 12 denotes a spacer, or projection or rib lying between adjacent faces of the ribbon turns or washers 11, and the reference character 13 denotes the resulting filtering interstice or slot. The height of the spacers, ribs or projections 12 as well as the lateral spacings between adjacent ribs 12 define the dimensions of the slots or interstices 13. For convenience, the height of the slot 13 is defined as that provided by the height of the spacers, ribs or projections 12 while the length of the slots is defined as that provided by the lateral spacing between adjacent spacers, ribs or projections 12. The lengths of the slots can be varied merely by change in the lateral spacing between spacers, ribs or projections. There are limitations, however, from a mechanical point of view, which prevent reduction below definite limits of the heights of the slots because it is not possible mechanically to produce the uniform ribs, spacers or projections whose heights will be small enough to meet all filtering conditions. Filtering conditions often require filtering interstices or slots whose height is so small that mechanical means presently available do not yield such slots when the filter elements are manufactured.

A method of treatment illustrated diagrammatically in the flow diagram of Figure 2 copes with and solves the problem.

Referring now to this figure and to Figure 1, the reference character 10 denotes a manufactured slotted cylinder of one of the three edge type filter elements hereinabove described which has the slots or filtering interstices of definite and determined area 13 whose dimensions it is desired to alter by way of reduction to meet a specific filtering situation. This slotted cylinder 10 which is open ended is mounted temporarily between a pair of end pieces 15 and 16 which act to close off the opposite open ends of the cylinder 10. One of the end pieces, for example, the end piece 15, has a closed-off end perforated tube 17 mounted thereon. The tube 17 extends axially through the cylinder 10 and out of the other end piece 16 and is connected, for example, through a coupling 18 to a vacuum or suction line 19.

Fine metallic dust ranging from 10 to 40 microns in size, for example, of copper, aluminum, magnesium, cadmium, brass, bronze, zinc, nickel, or steel, and consisting either of one of these metals, or any suitable mixtures of such metals, is dispersed in the ratio of 25% to 50% by volume in any of several liquid dispersants. Or, if desired, a powder of one of the fibrous complex silicates, such as rock wool or glass, may be mixed with one of the metal powders. When such a powder is added to the metallic dust, it is added in the percentage of approximately 10%-20% by wgt. of such metallic dust. Preferably, such liquid dispersant is a highly volatile substance such as alcohol or any other volatile liquid of the ketone or hydrocarbon groups. An example of a suitable ketone is acetone, while an example of a suitable hydrocarbon group liquid is carbon tetrachloride. It is not intended that these specific examples of volatile liquid dispersants be considered as limiting in any respect. It is understood that almost any volatile liquid that will act as a suitable dispersant for the metallic dust can be utilized and use of such liquids is contemplated. The main requirement of the volatile liquid substance or dispersant is that it be reasonably safe to use, inexpensive and sufficiently liquid at usual room temperatures to act as a dispersant for the metallic dust so that the dispersion can be sprayed or coated on the element 10, and at the same time be sufficiently volatile to evaporate when exposed to atmospheric or other conditions as will be hereinafter described.

The dispersion consisting of metallic dust as above described, and volatile liquid dispersant, is deposited as a coating on the outer surface of the slotted cylinder 10 in any number of convenient ways. For example, as illustrated in Figure 2, the dispersion is sprayed onto the outer surface of the cylinder 10, for example, by the use of a spray gun 20 of any conventional kind. During such spraying the vacuum line 19 is connected to suction so that the sprayed dispersion applied to the surface of the cylinder 10 is drawn partially into the filtering interstices 13 thereof from the outside surface towards the inner surface of said cylinder. As an alternative for spraying, the dispersion may be brushed over the outer surface of the cylinder 10 while the vacuum line 19 is connected to suction. As another alternative, the cylinder 10 may be dipped into a suitable container (not shown) containing the dispersion. The application of the dispersion to the outer surface of the filter element 10 while maintaining suction through the line 19 effects a thorough even coating of all outwardly exposed surfaces of the element 10. There is also a partial penetration and coating of the walls of the spacers, projections or ribs and walls of the ribbons or washer 11 defining the filtering interstices or slots 13. After coating of the cylinder 10 with the dispersion as described, excess coating deposited on the outer surface of the element 10 is wiped off. By excess coating is meant that portion of the coating which would tend to drip from the cylinder 10 after it had been coated either by spraying, brushing or dipping as above described. After wiping off said excess coating, the coated element 10 is allowed to stand for a sufficient length of time for the volatile portion of the dispersion to evaporate. Evaporation may occur simply by allowing the coated filter element 10 to stand in an atmospheric environment at ordinary room temperature. If desired, suction may be maintained in the vacuum line 19 to speed the evaporation and to withdraw volatile fumes as they occur. In any event, evaporation of the volatile component of the coating leaves a fine dust deposit on the element 10 both on walls defining its interstices or slots 13, and also on the solid portions of the outer surface of the element 10.

When evaporation has been completed, the dust particle carrying filter elements 10 are given a heat treatment in a suitable furnace or oven (not shown) so as to permanently fix the metallic dust deposit carried thereon to the element in the regions hereinabove mentioned. The heat in the furnace or oven is maintained at a sintering temperature. By sintering temperature is meant a temperature which will sinter the metallic dust deposited on the element 10 and attach it thereto. This sintering temperature is just below the melting point of the dust particles, and, of course, is less than the melting point of the metallic material that forms the filter element 10.

For example, if the metallic dust is of copper, and the filter element is of similar metal, the sintering temperature in the oven will be approximately 300° to 400° F. The metal dust thus becomes permanently fixed to the filter element 10. The result is that the sintered dust particles 21 as seen in Figure 3 reduce the effective open area of the filtering interstices or slots 13 so that the net or effective filtering area of said interstices or slots 13 is materially smaller than what it would be without the presence of the sintered dust deposit 21. The extent of reduction of the areas of the slots or filtering interstices 13 may be controlled to any desired degree by regulating the thickness of the coating of dust deposited on the slotted cylinder 10, as hereinabove described. Moreover, it can be further controlled by the percentage of dust dispersed in the liquid dispersant and by use of volatile liquid dispersants of different desired viscosities.

Referring now to Figures 4 and 5, a modified method of treatment is illustrated diagrammatically in the flow diagram of Figure 4. As shown in this figure, 10a denotes a filter element of any one of the three edge types of filter elements hereinabove described which has the filtering interstices or slots 13a whose areas it is desired to alter by way of reduction to meet specific filtering situations. This filter element 10a is mounted between a pair of end pieces 15 and 16 in the same way as the element 10 of Figure 2 and for the same purposes.

Fine metallic dust of the same range of size, as in the example of the first described method and of the same materials and in the same range of percentages by volume is dispersed in a lacquer dispersant rather than the liquid dispersants described with reference to Figure 2. One form of lacquer as is well known includes a non-volatile resin, such as lac; and a volatile solvent, such as methyl alcohol. While the lacquer including the specific lac and volatile solvent just mentioned is preferable, it is to be understood that any other of the commercially available lacquers, either synthetic or oriental, with their usual volatile solvents, are contemplated as useful dispersants for the metallic dust. The main requirement of the lacquer dispersant is that it should have a non-volatile portion or component that is combustible and also a volatile portion or component that will evaporate when exposed either to normal atmospheric conditions or to heat below the flash point of the volatile component of the solvent. The metallic dust dispersed in the lacquer, i. e. the dispersion, is deposited on the outer surface of the slotted cylinder 10a as a coating in any one of the ways described with respect to Figure 2, for example, by the spray gun 20. During deposit of this dispersion on the outer surface of the slotted cylinder or filter element 10a suction is maintained through the line 19 for the same purposes as with the method of Figure 2. The dispersion coats the outer surface of the filter element 10a and penetrates its filtering interstices or slots 13a in the same way as the coating described with respect to the method of Figure 2. Upon completion of the coating of the element 10a with the dispersion, it is removed to an oven or furnace which is maintained at a temperature ranging from approximately 100° to approximately 200° F. for the purposes of drying the coating by evaporating the volatile portion of the lacquer dispersant in the coating.

This drying leaves the metallic particles of the coating suspended in the non-volatile portions or components of the lacquer. The dried coating containing the metallic particles and non-volatile portions or components of the lacquer still adheres to the portions of the filter element 10a on which it has been deposited, the metallic particles being in suspension in the dried coating in the non-volatile portions or components of said lacquer. The dried coating covers the outer openings of the filtering interstices or slots 13a and also has penetrated into the slots from their outer openings partially across their radially directed widths toward their openings at the inner surface of the element 10a. The coating also lies on the outer solid surfaces of the ribbon turns or the washers forming the filter element 10a.

The filter element 10a with its dried coating is then transferred to a second furnace or oven maintained at a temperature ranging from 300° F. to 400° F. The heat of this second furnace or oven acts upon the dried coating to burn off the non-volatile lacquer components remaining therein. In the burning off some charred skeletal remains of the burned off components in the form of small particles are left. These small particles are intermingled with the metallic dust particles. In addition, voids are created so that the dried coating is converted into a porous mass. This porous mass remains adhered about the aforementioned surfaces of the filter element 10a.

The filter element 10a containing the aforedescribed porous mass is then either in the same oven or in another oven heated to a sintering temperature on the order of approximately 600° F. to 1950° F. depending on the nature of the metal and other constituents of the porous mass. The purpose of this sintering heat is to fix permanently the metallic dust particles of the porous mass to the metallic material forming the filtering element 10a. The sintering temperature is just below the fusion temperature of the metallic dust particles and of the metallic material forming the filter element 10a.

The final filter element 10a resulting after the sintering treatment just described is seen in fragmentary sectional view in Figure 5. As appears from that figure, the porous coating consists of sintered metallic dust particles 21a, charred remnants 23a of the non-volatile components of lacquer and voids 24a. The porous coating, noted generally by the reference character 25 as seen lies permanently adhered to the outer surfaces of the filter element 10a and also projects partially into the interstices or slots 13a between adjacent ribbon turns or washers 11a that define said filtering element. In effect the porous coating 25 partially obstructs the entrances to the slots or interstices 13a from their outer sides thereby reducing the net filtering area of said interstices. The extent of reduction of the net filtering area of said interstices 13a is determined by the size of the metallic dust particles 21a, the sizes of the charred remnants 23a and the sizes of the voids 24, and also by the relative thickness of the entire porous coating 25.

The porosity of this coating 25, as will be readily understood, may be varied by changing the dimensions of the metallic dust particles within the ranges specified hereinabove, by changing the nature of the lacquer dispersant in which the dust particles are originally dispersed, and also by controlling the thickness of the original dispersion applied to the filter element 10a. Furthermore, the thickness of the porous coating 25 may be changed by repeating all of the steps of the above described process of Figure 4 for any selected number of times. It is to be understood that repetitions of the steps of the process of Figure 2 are also contemplated, if necessary for varying the percentage of the obstruction of the interstices 13 of Figure 3.

Referring now to Figures 6 to 8, inclusive, a still further modified method of treatment is illustrated diagrammatically particularly in the flow diagram of Figure 6 and in the diagrammatic showing of Figure 7. As shown in Figure 6, 10b denotes a filter element in form of a slotted cylinder being of one of the three edge types of filter elements hereinabove described. This element 10b has the filtering interstices or slots 13b whose dimensions it is desired to alter by way of reduction to meet specific filtering situations. This element 10b is mounted between a pair of end pieces 15 and 16 in the same way as the element 10 of Figure 2 and for the same purposes.

Fine metallic dust of the same range of size as in the example of the first described method of Figure 2 and of the same materials and in the same range of percen- tages by volume, and, preferably, in the higher percentages of said range is dispersed in a lacquer dispersant of the same kind as that described with reference to the method of Figure 4. It is to be understood that other lacquers besides those mentioned hereinabove may also be used. However, those specifically mentioned have been found suitable and are preferable. The dispersion consisting of metallic dust in the proportions mentioned and dispersed in the lacquer dispersant is deposited as a coating on the outer surface of the slotted cylinder 10b in any one of the ways described with respect to the method of Figure 2, for example, by the spray gun 20. As before, during the spraying of the filter element 10b, suction is maintained through the vacuum line 19 for the same purposes hereinbefore described with reference to Figure 2. The coating of the metallic dust lacquer dispersion is deposited substantially in the same way as that described with respect to Figures 2 and 4, it being noted that part of the coating penetrates the filtering interstices or slots 13b radially from their outer openings toward their inner openings at the inner surface of the filter element. Upon completion of the application of the dispersion as a coating upon the filter element 10b, the coated element is subjected to electroplating treatment. It is transferred to an electroplating apparatus, for example, that illustrated diagrammatically in Figure 7. Such apparatus comprises generally a metallic container or vat 30 which is connected by a wire 31 to the negative pole of a source of electric power (not shown). The vat 30 carries an electrolyte or plating solution 32 which, for example, may be copper sulfate $CuSO_4$ solution of a sufficient strength for electroplating purposes. The nature of the plating solution 32 depends, of course, upon the nature of the metallic dust particles in the coating on the filter element 10b.

The coated filter element 10b which is itself metallic, is connected, for example, by a wire 33 to the positive pole of the source of electric power (not shown). It is then immersed in the solution 32 and the power from the source is switched on. Electric current flow between the vat or container 30 through the electrolyte 32 and the coated filter element 10b immersed in said electrolyte effects an electroplating action between the metallic dust particles in the coating on the filter element 10b and also between said dust particles and the metallic surfaces of the filter element with which they either are in contact or in proximity. The electroplating action results thus in partial bonding of the metallic dust particles to each other and also to the surfaces of the filter element on which they lie or with which they are in close proximity. The electroplating action is continued for a sufficient length of time which depends upon the nature of the electrolyte and the power rating of the source of electric energy. For example, if the electrolyte is a conventional alkali copper bath solution, and the current density through the electrolyte 32 is approximately 100 amperes per square foot, the electroplating action is carried on to effect a plating action equivalent to approximately 2500 ampere minutes per square foot.

Upon completion of the electroplating action as just described, the filter element 10b is removed from the electrolyte 32 and washed to remove residual electrolyte therefrom. The electroplating-treated filter element 10b is then transferred to a furnace or oven which is maintained in a temperature ranging from approximately 300° F. to approximately 400° F. The heat in this furnace or oven is sufficient to dry the washed filter element and also to burn off therefrom the volatile and combustible components of the lacquer which were initially used as the dispersant for maintaining the metallic particles adhesively on the filter element during the electroplating step just above described. The burning off of the volatile components of the lacquer leaves a porous coating consisting of the electroplated dust particles 21b, charred remains in the form of small particles 23b of the lacquer component of the original coating and voids 24b, all in the form of a porous coating 25b on the surfaces of the ribbon turns or washers 11b forming the filter element 10b as seen in Figure 8.

The density of this porous coating 25b is greater than that of the porous coating 25 of Figure 5 because of the electroplating step included in the process of Figures 6 and 7. It is to be noted again with respect to Figure 8 that the porous coating 25b not only completely coats the entire outer surface of the filter element 10b but partially extends radially into the slots 13b toward the inner surface of the element. The effective reduction in filtering area resulting from the porous coating 25b is greater than that effected by the porous coating 25 of Figure 5. Thus, it is generally not necessary to repeat the steps of the processes of Figures 6 and 7 to secure an effective reduction of the net filtering areas, interstices or slots 13b. However, if in practice it is found necessary, all of the steps of Figures 6 and 7 may be repeated until a porous coating 25b of necessary thickness results for any filtering condition.

Figures 9–13, inclusive, illustrate various metallic edge-type filter elements that have been treated in accordance with the methods of Figures 2–8, inclusive. For example, in Figures 9 and 10 the reference character 10c denotes a metallic edge-type filter element of the completey self-supporting type which has been manufactured in accordance with the teachings of the aforesaid Kovacs Patent No. 2,622,738, and has then been subjected to the dust particle coating treatments of one of the three variants of the method of this invention as hereinabove described.

This element 10c comprises a thin flat metallic ribbon 11c bearing transversely extending projections or ribs 12c one one of its wide faces. This ribbon as described in the aforesaid Kovacs patent has been coated with a fusible metallic coating (not shown) and then the ribbon 11c has been wound into helical turns with the ribs 12c on one wide face in contact with the adjacent smooth wide face of the ribbon in an adjacent turn. The winding has been effected as described in the aforesaid Kovacs patent until a sufficient number of turns of ribbon produce the tubular filter element 10c. This tubular element after winding of the ribbon, as just described, has been subjected to a heat treatment resulting in permanent bonding of the ribs or projections 12c to the adjacent ribbon turns by a fusion of the metallic coating on the ribbon. The resulting filter element 10c has the filtering interstices or slots 13c which provide edge-type filtration. This filter element 10c after manufacture in accordance with said Kovacs patent to produce the structure just described has been treated in accordance with the methods of Figures 2–8, inclusive, as hereinabove set forth, to provide further desired reduction of the net filtering areas of the slots or interstices 13c. In other words, the areas of the filtering interstices or slots 13c have been reduced either by the process of Figures 2 and 3 or its variant of Figures 4 and 5 or its variant of Figures 6, 7 and 8 to yield the dust coated features about its interstices 13c as illustrated respectively in Figures 3, 5, or 8, wherein, as shown, metallic dust particles partially obstruct the outer portions of the filter interstices or slots to reduce their net filtering areas.

In Figure 9 a filter element 10c, treated according to one of the method variants of Figures 2–8, inclusive, is shown mounted in position of use in a filter housing denoted generally by the reference character 40. This housing 40 is substantially identical with that of Figure 2 of the aforesaid Kovacs patent and includes a hollow casing 41 and a casing head 42. A sealing gasket 43 provides an effective seal at the joint between the head 42 and the casing 41. An inlet passageway 44 serves to admit oil or other fluid to be filtered into the casing 41. An outlet passageway 45 permits the filtered fluid to flow out of the casing. The metallic filter element 10c is secured in place in the axial direction of the casing 41 by an axially extending mounting bolt 46 which is headed at one end 47 to engage a cap 48; and is threaded at 49 for securement to the head 42. The cap 48 fits over one end of the filter element 10c and the other end of the latter abuts the head 42 about a portion of the outlet 45. The oil or other liquid to be filtered flows to casing 40 through inlet 44, downwardly in the latter, laterally through the filtering interstices 13c, and upwardly and out of head 42 via the outlet passageway 45 as denoted by the arrows in Figure 9. Dirt is collected on the outer surface of the filter element 10c. The united head 42 and casing 20 bearing the filter element 10c are supported by a case-retaining yoke 49 which latter serves to hold the head 42 and casing 41 in joint-sealed condition. These parts may be readily separated for inspection, cleansing or replacement of the filter element 10c.

While a specific filter housing 40 has just been described in which the filter element 10c may be mounted, it is not intended that this filter housing be considered the only type useful. Any of the conventional filter housings presently extant with which metallic edge-type filter elements may be used are contemplated as useful for filter elements produced in accordance with the practices of this invention.

In Figure 11 a filter element 10d is shown which has been constructed in the same way as the filter elements of the aforesaid Liddell Patent No. 2,042,537. This filter element 10d is initially manufactured as described in said Liddell patent, from thin flat ribbon 11d (Fig. 12) having transverse ribs 12d. The ribbon 11d is wound into helical turns on a fluted drum 51 which corresponds to the fluted drum shown in Figures 5, 6 and 7 of the aforesaid Liddell patent. By reason of the ribs 12d filtering interstices 13d of definite and determined dimensions are defined between adjacent turns of the ribbon. The turns of said ribbon 11d are permanently retained upon the fluted drum 51 between the flange 52 thereon and the cap 53. The filtering interstices 13d are those whose net filtering areas are reduced by the practices of the present invention. The same area reduction by the metallic dust particles as illustrated in Figures 3, 5 or 8 of this application results. This filter element 10d may be used in the housing 40 of Figure 9 or in any other conventional filter housing adapted to receive a metallic edge-type filter element. A filter element 10d is the frame-supported edge-type filter element described at the outset of this specification.

Figure 13 illustrates diagrammatically a metallic edge-type filter element 10e of the so-called stack type and consists generally of a plurality of stacked thin flat rings 11e provided with spacers or projections 12e which separate adjacent rings and provide filtering interstices 13e between adjacent rings. These filtering interstices 13e are those whose effective area is reduced by treatment in accordance with the practice of this invention whereby the metallic dust particles provide partial obstruction and thereby effective reduction in the net filtering areas available through the filtering interstices 13e. The filtering element 10e which is treated in accord with the practice of this invention is substantially similar to the filtering elements disclosed in the aforementioned Heftler Patent No. 2,436,108.

It is to be understood that any other metallic edge-type filtering elements may be treated in accordance with the practices of this invention to provide effective reduction of filtering areas of definitely defined filtering interstices when such areas must be reduced to meet specific filtering conditions.

While specific embodiments of the invention have been described herein, variations in practice are possible and are contemplated within the scope of the appended claims. There is no intention, therefore, of limitation to the exact details shown and described.

What is claimed is:

1. That improvement in the process of preparing metal edge type filtering elements having filtering interstices each of a determined area including method steps to vary the sizes of said areas, said steps comprising dispersing a metallic dust in a highly volatile liquid dispersant, applying the dispersion to surfaces of said element in the region of said interstices and applying sintering heat and thereby permanently fixing the dust of the dispersion to said surfaces as a porous intersticial area reducing coating.

2. That improvement in the process of preparing metal edge type filtering elements having filtering interstices each of a determined area including method steps to vary the sizes of said areas, said steps comprising dispersing a metallic dust in an alcohol dispersant, applying the dispersion to surfaces of said element in the region of said interstices and applying sintering heat and thereby permanently fixing the dust of the dispersion to said surfaces as a porous intersticial area reducing coating.

3. That improvement in the process of preparing metal edge type filtering elements having filtering interstices each of a determined area including method steps to vary the sizes of the areas, said steps comprising dispersing a metallic dust in an alcohol dispersant, applying the dispersion to surfaces of said element in the region of said interstices, evaporating the alcohol dispersant of the so-applied dispersion on said element thereby leaving metallic dust as a residual deposit on said surfaces, and then heating said element to sintering temperature to permanently fix the dust of said residual deposit to said surfaces as a porous intersticial area reducing coating.

4. That improvement in the process of preparing metal edge type filtering elements having filtering interstices each of a determined area including method steps to vary the sizes of said areas, said steps comprising dispersing a metallic dust in an alcohol dispersant, applying the dispersion to surfaces of said element in the region of said interstices, removing excess of the dispersion on said surfaces, evaporating the alcohol dispersant of the so-applied dispersion which remains on said element thereby leaving a metallic dust residue on said surfaces, and then applying sintering heat and thereby permanently bonding the dust residue as a porous mass to said surfaces.

5. That improvement in the process of preparing metal edge type filtering elements having filtering interstices each of a determined area including method steps to vary the sizes of said areas, said steps comprising dispersing a metallic dust in a lacquer dispersant, said lacquer dispersant having volatile and non-volatile components, applying the dispersion to surfaces of said element in the region of said interstices, eliminating the volatile component of the lacquer dispersant, partially burning the non-volatile component thereby leaving a residual coating including metallic dust and charred skeletal remains on said surfaces and then heating said element to the sintering temperature of the dust to bond the metallic dust of said residual coating permanently to said surfaces.

6. An edge-type metallic filter element comprising adjacent metallic parts arranged in tubular form, spacing members positioned between said adjacent metallic parts to define filtering interstices of determined areas, and a porous coating on surfaces of said metallic parts and of said spacing members adjacent said filtering interstices which serves to reduce dimensions of the determined areas of said filtering interstices, the coating consisting of metallic dust particles and particles of charred skeletal remains of non-volatile components of lacquer intermingled with the metallic dust particles and also including voids between particles, said particles partially covering and partially filling in said interstices and thereby effecting a reduction in dimensions of the original determined areas of said interstices, and said metallic dust particles being permanently cohered to the said metallic surfaces.

References Cited in the file of this patent

UNITED STATES PATENTS

| | | |
|---|---|---|
| 1,060,938 | Plathner et al. | May 6, 1913 |
| 1,268,274 | Nicholas | June 4, 1918 |
| 1,673,743 | Fulcher et al. | June 12, 1928 |
| 2,042,537 | Liddell | June 2, 1936 |
| 2,133,004 | Williams et al. | Oct. 11, 1938 |
| 2,164,142 | Moore | June 27, 1939 |
| 2,408,515 | Hopkins | Oct. 1, 1946 |
| 2,436,108 | Heftler | Feb. 17, 1948 |
| 2,454,982 | Wallace | Nov. 30, 1949 |
| 2,576,372 | Toulmin et al. | Nov. 27, 1951 |
| 2,622,738 | Kovacs | Dec. 23, 1952 |